(No Model.)
R. H. BARNES & G. C. SALLES.
ANT TRAP.
No. 352,289. Patented Nov. 9, 1886.
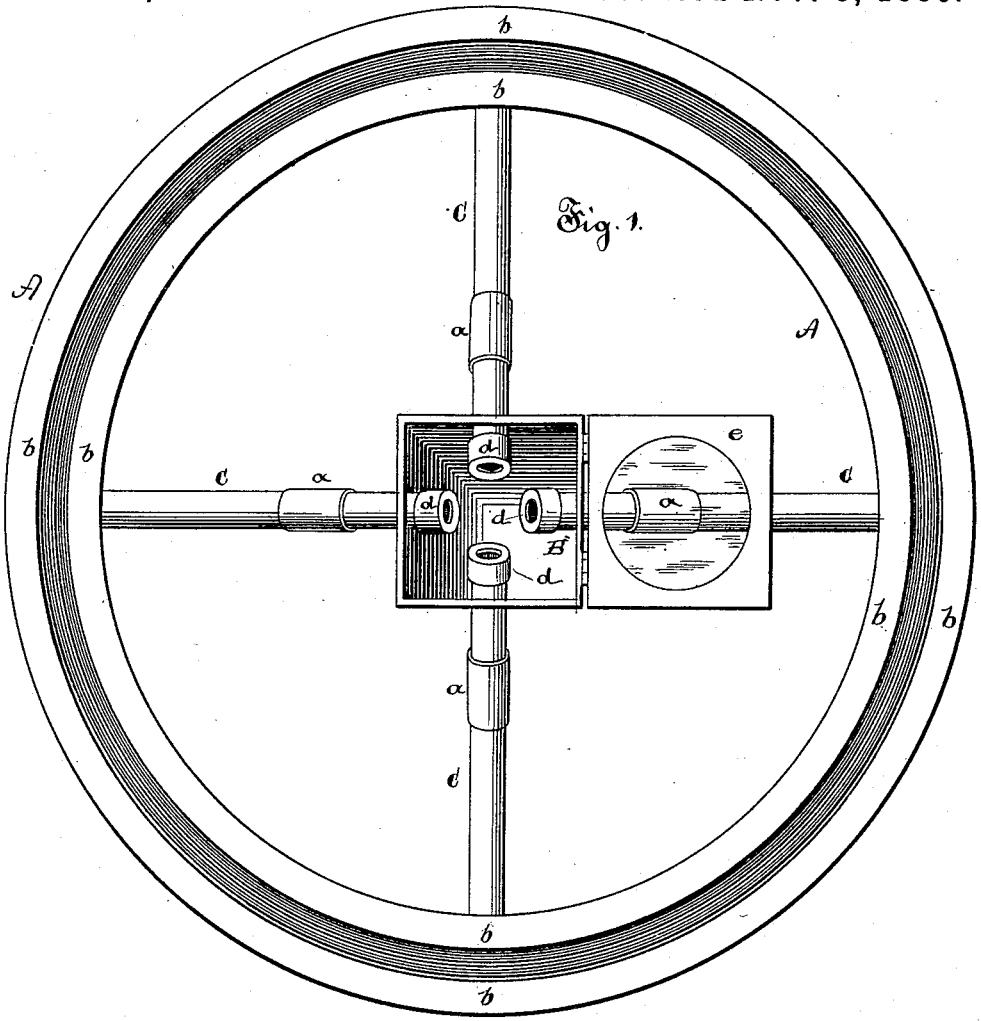
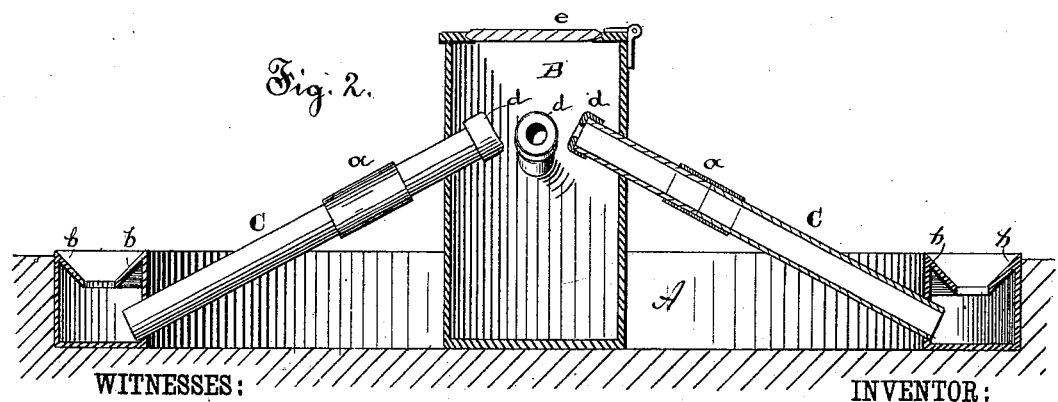
WITNESSES:
O. D. Mott
C. Sedgwick
INVENTOR:
R. H. Barnes
G. C. Salles
BY Munn & Co
ATTORNEYS.

UNITED STATES PATENT OFFICE.

ROBERT H. BARNES AND GEORGE CAMIEL SALLES, OF CUERO, TEXAS.

ANT-TRAP.

SPECIFICATION forming part of Letters Patent No. 352,289, dated November 9, 1886.

Application filed June 17, 1886. Serial No. 205,473. (No model.)

*To all whom it may concern:*

Be it known that we, ROBERT HANSON BARNES and GEORGE CAMIEL SALLES, of Cuero, in the county of De Witt and State of Texas, have invented a new and Improved Ant-Trap, of which the following is a full, clear, and exact description.

Our invention relates to ant-traps, and has for its object the production of a simple, cheap, and effective device whereby the ants are confined to a space within the circle of the trap, speedily captured, and exterminated. It consists in a trap constructed with a circular flanged pit provided with tubes leading therefrom to a central ant-receptacle; also, in the details of construction of the trap, as will be hereinafter set forth.

Reference is to be had to the accompanying drawings, forming a part of this specification, in which similar letters of reference indicate corresponding parts in both the figures.

Figure 1 is a plan view of my ant-trap, and Fig. 2 a vertical longitudinal section thereof.

The letter A designates a circular pit constructed with a bottom and sides, the side-pieces being bent over to form beveled flanges $b$ $b$, which partially cover the top. Leading from this circular pit A, and connecting therewith a centrally-placed ant-receptacle, B, are a series of tubes, C C. These tubes C C, made preferably of glass, are formed in two sections, the lower ones leading out from the circular pit A, where they are secured, and united to the upper sections, which pass through into the ant-receptacle B, by means of metallic collars $a$, adapted to slide upon the said tubes. We usually construct our trap with four such tubes, one entering each side of the ant-receptacle; but more may be employed, if desired. The ends of the upper sections of the pipes C, extending into the ant-receptacle B, are provided with circular metal tips $d$, so that when the ant-receptacle is lifted out from the body of the trap the disconnected upper sections of the pipes C will not drop out therefrom. The ant-receptacle B is provided with a hinged cover, $e$, in which a pane of glass is set to observe its contents.

The operation of our trap is as follows: The trap is placed around an ant's nest, with the circular pit A sunk in the ground. The ants passing over the edge and down the beveled flanges $b$, fall into the pit, and as they are prevented by the flange from escaping through the top, pass up the tubes C and fall into the ant-receptacle B, centrally located within the circular pit. When the ant-receptacle is full, as can be ascertained by glancing through the glass in the lid, it can be lifted out and emptied by sliding the collars $a$ down the lower sections of the tubes C, leaving the upper sections of the said tubes only held in engagement with the ant-receptacle through the metal tips $d$ upon their inner ends. When emptied, it is replaced and the collar $a$ slid up again to cover the points of contact of the upper and lower sections of the tubes C, making them continuous, and the trap is again in working order.

Having thus described our invention, what we claim as new, and desire to secure by Letters Patent, is—

In an ant-trap, the combination, with an annular box, A, adapted to surround an ant's nest, and provided with a downwardly-inclined annular flange, $b$, of the central ant-receptacle, B, provided with a hinged lid having a sight-opening therein, a series of divided tubes, C, connecting said annular box and ant-receptacle, collars $a$, covering the divisions in said tubes, and perforated metal caps $d$ at the upper ends thereof, substantially as shown and described, whereby the ants are held within said annular box and conducted from thence to the central receptacle, B, as set forth.

ROBERT H. BARNES.
GEORGE CAMIEL SALLES.

Witnesses:
JULIUS GOHMETT,
PIUS FRY.